United States Patent [19]
Hara et al.

[11] Patent Number: 5,176,085
[45] Date of Patent: Jan. 5, 1993

[54] POSITION DETECTING DEVICE

[75] Inventors: Masayoshi Hara, Nagano; Hiroshi Kumatani; Takashi Nakamura, both of Aichi, all of Japan

[73] Assignee: Mitsubishi Denki K.K., Tokyo, Japan

[21] Appl. No.: 596,664

[22] Filed: Oct. 11, 1990

Related U.S. Application Data

[63] Continuation-in-part of Ser. No. 545,729, Jun. 29, 1990, abandoned, which is a continuation-in-part of Ser. No. 454,240, Dec. 21, 1989, abandoned.

[30] Foreign Application Priority Data

Dec. 23, 1988 [JP] Japan ................................ 63-325260
Jun. 30, 1989 [JP] Japan .................................. 1-168382

[51] Int. Cl.$^5$ ......................... D05B 69/24; G01D 5/34
[52] U.S. Cl. ............................... 112/275; 250/231.18; 341/13
[58] Field of Search ................... 112/275, 277, 67, 87; 250/231.14, 231.17, 231.18, 231.13; 318/467; 341/13, 11, 15

[56] References Cited

U.S. PATENT DOCUMENTS

| 4,406,934 | 9/1983 | Elszasz | 200/61.39 |
| 4,700,062 | 10/1987 | Ernst | 250/231.18 |
| 4,740,691 | 4/1988 | Ushiyama | 250/231.18 X |
| 4,920,905 | 5/1990 | Nakamura et al. | 112/275 |
| 4,987,842 | 1/1991 | Nakamura et al. | 112/275 |

FOREIGN PATENT DOCUMENTS

| 7605936 | 2/1976 | Fed. Rep. of Germany . |
| 2821543 | 12/1978 | Fed. Rep. of Germany . |
| 6145081 | 3/1986 | Japan . |

Primary Examiner—Peter Nerbun
Attorney, Agent, or Firm—Sughrue, Mion, Zinn, Macpeak & Seas

[57] ABSTRACT

A position detecting device such as a needle position detecting device which detects a needle position with the aid of a rotor. In the position detecting device, the rotor and a position detecting annular member are abutted against each other, and thus the use of screws can be eliminated, and the annular member can be readily adjusted in angular position with a tool which is inserted through the holes of the rotor and engaged with the adjusting means of the annular member.

27 Claims, 11 Drawing Sheets

POSITION DETECTING DEVICE

This is a continuation-in-part application of U.S. application Ser. No. 07/545,729 filed Jun. 29, 1990 which is a continuation-in-part application of U.S. Ser. No. 07/454,240 filed Dec. 21, 1989, both now abandoned.

BACKGROUND OF THE INVENTION

This invention relates to a position detecting device such as a needle position detecting device which detects a needle position with the aid of a rotor.

FIGS. 12 through 16 shows a conventional sewing machine needle position detecting device disclosed by Japanese Utility Patent Application (OPI) No. 45081-1986 (the term "OPI" as used herein means an "unexamined published application"). In those figures:

Reference numeral 2 designates a spindle for moving a sewing needle up and down. The spindle 2 is rotatably supported by a bearing 1a which is integral with a sewing frame 1.

Reference numeral 3 designates a pulley driven through an endless belt 12 by an electric motor (not shown). The pulley 3 is fixedly mounted on the spindle 2 so that it is rotated together with the belt 12.

Reference numerals 4 and 5 designates a needle lower position indicating board and a needle upper position indicating board, respectively. The boards 4 and 5 are arranged on the inner end face of the pulley 3, which is on the side of the sewing machine frame 1 in such a manner that they are coaxial with the spindle 2 and the board 4 is located outside the board 5. The needle upper position indicating board 5 is secured to the pulley 3 with fixing screws 10 extended through arcuate elongated through-holes 3a which are formed coaxial with the spindle 2. Owing to the elongated through-holes 3a thus formed, the position of the needle upper position indicating board 5 in the direction of rotation can be adjusted from outside the pulley 3. The needle lower position indicating board 4 is held between the pulley 3 and the outer periphery of the needle upper position indicating board 5.

As seen in FIG. 14, the board 4 has a protrusion 4d. The protrusion 4d is engaged with a recess 3b formed in the pulley 3, so that the board 4 is fixed and may not rotate. The needle lower position indicating board 4 has a needle lower position detecting through-hole 4b in the inner peripheral portion thereof, and rotation speed detecting through-holes 4c in the outer peripheral portion thereof. The surface of the needle lower position indicating board except those through-holes is a mirror-finished reflecting surface 4a. As shown in FIG. 16, grooves 3c are formed in the portions of the pulley 3 which confront with the above-described through-holes 4b and 4c in such a manner that the bottoms of the grooves are inclined to the reflecting surface and painted black. Therefore, light is scarcely reflected at the through-holes 4b and 4c.

The needle upper position indicating board 5 has a needle upper position detecting through-hole 5b in the outer peripheral portion, and the surface of the board 5 except the through-hole 5b is formed into a mirror-finished reflecting surface 5a.

In FIG. 15, reference character 6a designates a needle upper position detector confronting with the needle upper position detecting through-hole 5b; 6b, a needle lower position detector confronting with the needle lower position detecting through-hole 4b; and 6c, a rotation speed detector confronting with the rotation speed detecting through-holes 4c. Each of those detectors has a light emitter and a light receiver. The light receiver detects whether or not the output light of the light emitter is reflected; that is, whether the output light is applied to the reflecting surfaces 4a and 5a or to the non-reflecting through-holes 4b, 4c and 5b, and provides a position detection signal.

The detectors 6a, 6b and 6c are mounted on a printed circuit board 9, and are covered with a detector cover 7 in such a manner that only the light emitting surfaces and the light receiving surfaces are exposed. The detector cover 7 is secured through a cover retainer 8 to the bearing 1a with screws 11.

The conventional needle position detecting device is designed as described above. Therefore, in order to adjust the needle upper position indicating board, it is necessary to loosen the screws 10; that is, the adjustment is rather troublesome. Furthermore, the needle lower position indicating board is fixed to the needle upper position indicating board in such a manner that it is not rotatable. Therefore, it is impossible to adjust the needle lower position indicating board separately from the needle upper position detecting board.

The reflecting surface of the needle upper position indicating board is not flush with that of the needle lower position indicating board, and therefore these two boards are different in the distance from the light emitting point to the light receiving point. Accordingly, it is necessary to adjust the positions of the detectors. In the case where the adjustment is not made, the installation of the pulley 3 on the spindle 2 is severe in dimensional tolerance and requires precise adjustment.

Finally, since the non-reflecting surfaces are the through-holes, it is necessary to form the groove in the part of the pulley which confronts with the through-holes in such a manner that its bottom is inclined with respect to the reflecting surface, and to paint the bottom black. Thus, the conventional needle position detector is large in the number of manufacturing steps, being unavoidably expensive.

SUMMARY OF THE INVENTION

Accordingly, an object of this invention is to eliminate the above-described difficulties accompanying a conventional a position detecting device. More specifically, an object of the invention is to provide a position detecting device in which, in the case where a position detecting annular member is provided between a support supporting a rotary shaft and a rotor secured to the rotary shaft so as to rotate together with the rotary shaft. Also, the position of the annular member can be readily adjusted from outside with the fixing screws left as they are. Moreover, even if a plurality of position detecting annular members are provided, they can be adjusted individually, and the distances from the support to those annular members are equal, and accordingly it is unnecessary to adjust the positions of the detectors. Finally, it is unnecessary to form the groove in the part of the pulley which confronts with the through-holes, nor to paint it black.

(1) The foregoing objects of the invention have been achieved by providing a position detecting device that comprises: a shaft; a support rotatably supporting said shaft; a rotor having at least one through-hole having a predetermined configuration which is cut along the axis of the shaft, the rotor being fixedly mounted on the shaft so that the rotor is turned together with said shaft;

an annular means mounted on the shaft in such a manner that said annular means is disposed between the support and the rotor, the annular means having a pusher provided on part of the annular means to push the annular member toward the rotor so that the annular means is rotated together with said rotor, position indicator provided on part of the annular means to indicate a predetermined position of the annular means, and an adjusting member for applying force through said throughhole of said rotor to said annular means so as to turn the annular means together with the rotor; and a detector secured to the support, for detecting the position indicator of the annular means which is rotating.

(2) The above-described position detecting device has at least two annular members, one annular member being provided closer to the rotor and being larger than the annular member closer to the support, and the annular member comprising a position detector provided on the part of the annular member closer to the rotor which is not overlapped by the annular member closer to the support; and a hole having a predetermined configuration which is formed in the annular member closer to the rotor in correspondence to the adjusting means of the annular member closer to the support.

(3) In the position detecting device, the annular member closer to the rotor has a recess coaxial with the shaft and the annular member closer to the support is arranged in the recess in such a manner that the annular member closer to the rotor is flush with the annular member closer to the support.

(4) in the position detector, the annular members may be made of a reflecting material, and have position detecting regions which are defined by coloring. Specifically, the annular elements are made of a light reflecting material, and the position detecting regions are defined by coloring the annular elements black, thus resulting in the elimination of the groove which is required in the case where the position detecting region is made up of through-holes.

In the position detecting device of the invention described in paragraph (1), the position detecting annular member is abutted against the rotor so that it is rotated with the latter, which eliminates the use of screws. The angular position of the annular member can be readily changed by applying a force to the adjusting member of the annular member which is greater than the force of abutting the annular member against the rotor. Furthermore, the slide board is held between the annular elements, so that the latter can be turned without affecting each other; that is, the annular elements can be adjusted in angular position independently of each other—the torque of one of the annular elements will not be transmitted to the other, and vice versa.

In the position detecting device of the invention described in paragraph (2) above, at least two position detecting annular members are provided. The annular members are made different in diameter so that the position indicating means may not be overlapped by each other, and the annular member smaller in diameter is positioned closer to the detector means (i.e., the support). Furthermore, in order to adjust the angular positions of the annular members through the holes formed in the rotor, holes are formed in the annular member closer to the rotor which is large enough to adjust the angular position of the annular member closer to the support. Therefore, the angular position of the annular member closer to the support can be adjusted by applying a force to the adjusting member through the holes in the annular member closer to the rotor and the holes in the rotor.

In the position detecting device of the invention described in paragraph (3) above, at least two position detecting annular members are provided, and the annular member closer to the support is put in the recess formed in the annular member closer to the rotor so that the position detector thereof are flush with one another. Therefore, the detectors secured to the support are equal in the distance from the support, with the result that it is unnecessary to adjust the positions of those detectors, and the output signals of the detectors can be processed in the same manner.

DESCRIPTION OF THE PREFERRED EMBODIMENTS

A first embodiment of this invention will be described with reference to FIG. 1A.

Figure 1A:
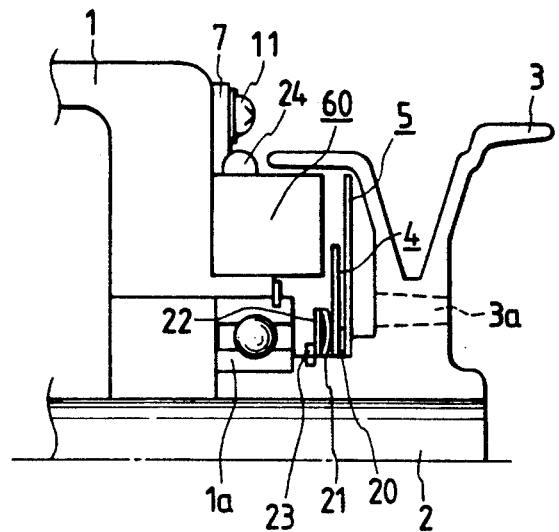
FIGS. 1A and 1B are side views, with parts cut away, respectively showing a first embodiment and second embodiment of this invention.

In FIG. 1A, reference numeral 1 designates a support, or a sewing machine frame; 2, a spindle for moving a sewing needle up and down, the spindle being rotatably supported by a bearing 1a on the sewing machine frame 1; 3, a rotor which is a pulley in the first embodiment which is driven through an endless belt (not shown) by an electric motor (not shown), the pulley being fixedly mounted on the spindle so that it is rotated together with the spindle, and 4 and 5, position indicating annular members, namely, a disc-shaped needle lower position indicating board and a disc-shaped needle upper position detecting board, respectively. The boards 4 and 5 are arranged between the pulley 3 and the sewing machine frame 1 in such a manner that the board 5 is closer to the pulley body than the board 4, and the boards 4 and 5 are rotatable with respect to the pulley 3.

Further, in FIG. 1A, reference numeral 20 designates a slide board held between the needle upper position indicating board 5 and the needle lower position indicating board 4, the slide board 20 being made a material low in the coefficient of friction; 21, a pre-load spring for pushing the position indicating boards 4 and 5 and the slide board 20 towards the pulley 3 so that the position indicating boards 4 and 5 may not rotate with respect to the pulley 3 when the spindle starts, stops or rotates; and 22, an end board for retaining the position indicating boards 4 and 5, the slide board, and the preload spring 21; and 23, a C-ring supporting the boards 4, 5 and 20, the spring 21 and the end board 22 on the pulley 3.

Further in FIG. 1A, reference numeral 60 designates a detector unit comprising light emitter and light receiver; 24, a diode which emits light when electric power is applied to an electric motor (not shown) or a control board for controlling the motor, the diode 24 being installed on the outer cylindrical wall of the detector unit 60 in such a manner that it can be readily observed by the operator, and 7, a mounting ear of the detector unit 60 which is secured to the sewing machine frame 1 with a screw 11.

Figure 1B:
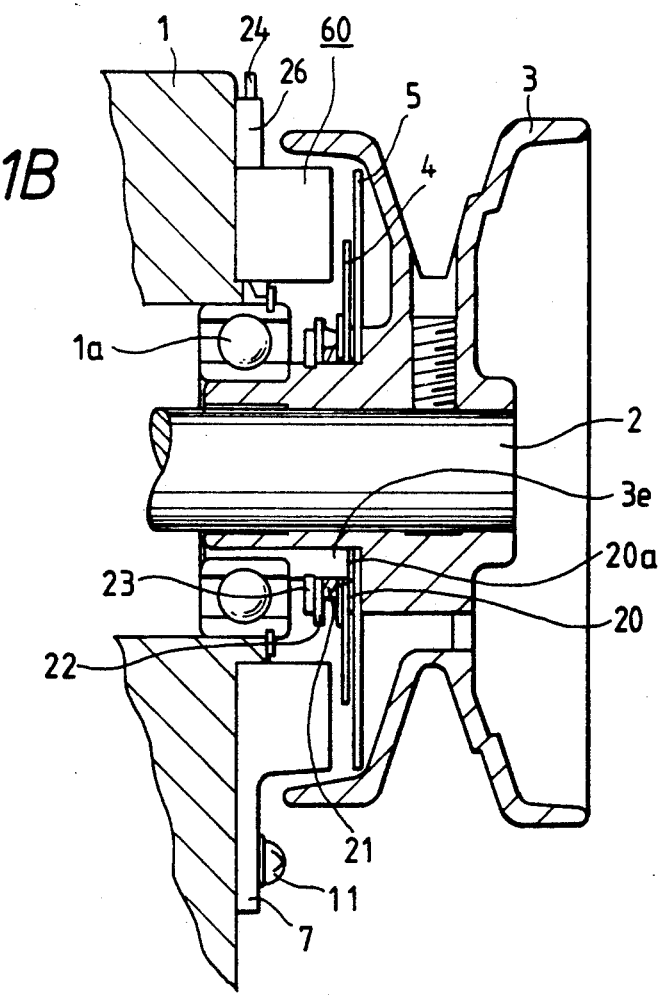

The second embodiment shown in FIG. 1B is substantially the same as that of the first embodiment, with like numbers referring to like components. However, the slide board 20 has a tongue 20a which is engaged with a recess 3e formed in the pulley 3 so that it is not rotatable with respect to the pulley 3.

Figure 2:
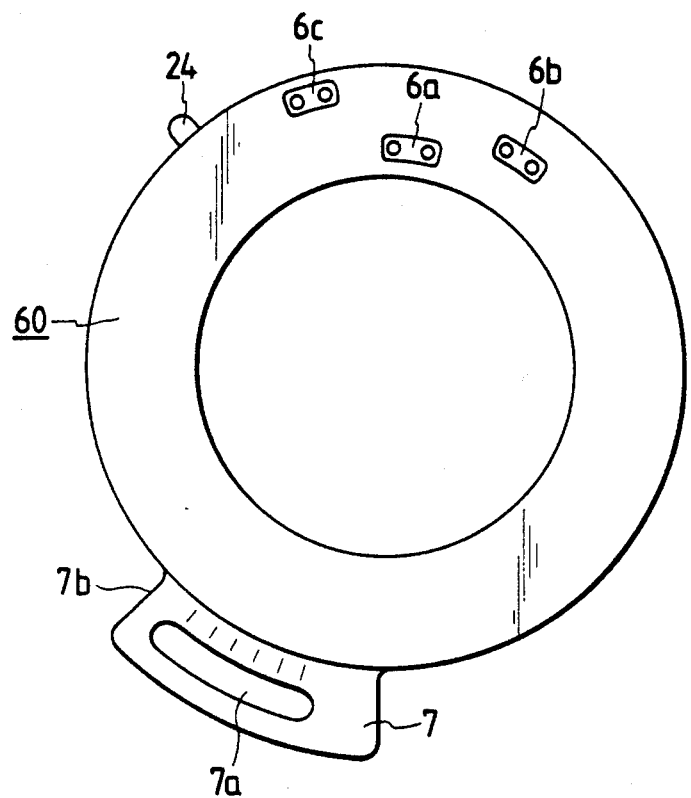
FIG. 2 is a diagram showing the right side of a detector unit applicable to the first and second embodiments of this invention.

FIG. 2 is a diagram showing the detector unit 60 as viewed from the pulley side. An elongated hole 7a is formed in the mounting ear 7 and can receive screw 11 so that the detector 60 can be adjusted in position by turning it when installed on the sewing machine frame 1. The detector unit 60 has a needle lower position detector 6a, a needle upper position detector 6b, and a rotation speed detector 6c. The detectors 6a, 6b and 6c, each having light emitters and light receivers, are positioned with the difference in position between reflecting surfaces (described later) taken into consideration; that is, they are so positioned that they are equal in the distance between the light emitting point and the light receiving point.

The ear 7 may have an angular scale 7b marked on it to read the angular position of the detector unit 60.

Figure 3A:
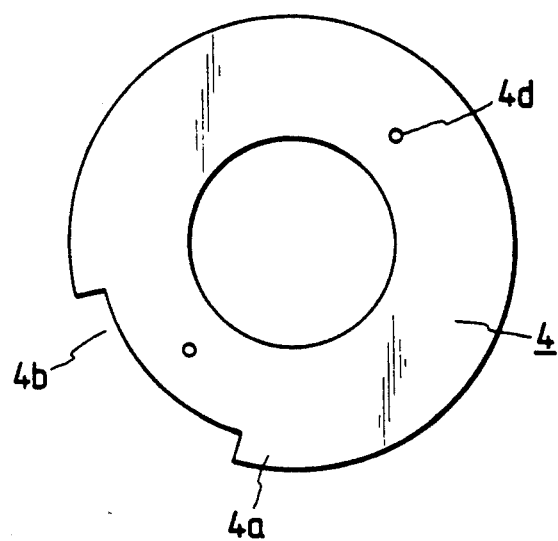
FIGS. 3A and 3B are diagrams showing a needle lower position detecting board for a first and second embodiment, respectively.

FIG. 3A is a diagram showing the needle lower position indicating board 4 of the first embodiment, as viewed from the sewing machine frame side. In FIG. 3A, reference character 4a designates a reflecting surface formed by plating a metal or plastic plate; 4b, position detecting means, namely, a needle lower position detecting through hole (or cut); and 4d, adjusting means, namely, adjusting holes provided in order to adjust the angle in the direction of the rotation of the needle lower position indicating board from outside the pulley 3.

Figure 3B:
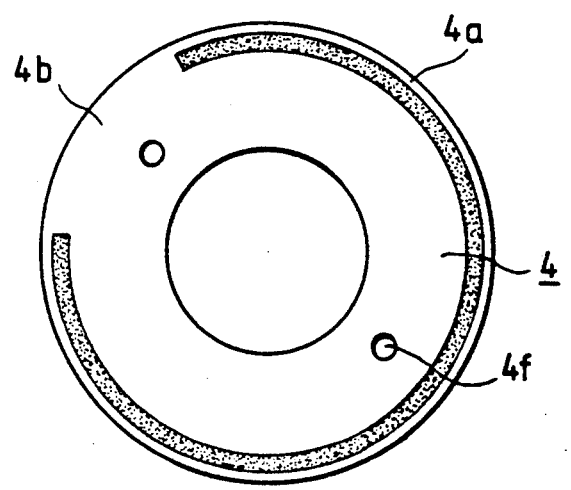

The needle lower position indicating board 4 of the second embodiment is as shown in FIG. 3B when viewed from the sewing machine frame side. The needle lower position indicating board 4 has: a position detecting region, namely, a needle lower position reflecting indicating means 4b which is formed on the rear surface of a transparent plastic plate by alumi-chrome plating; a non-reflecting surface 4a painted black by printing, for instance; and adjusting holes 4f for adjusting the angular position of the needle lower position indicating board 4 through the pulley 3 from outside.

Figure 4A:
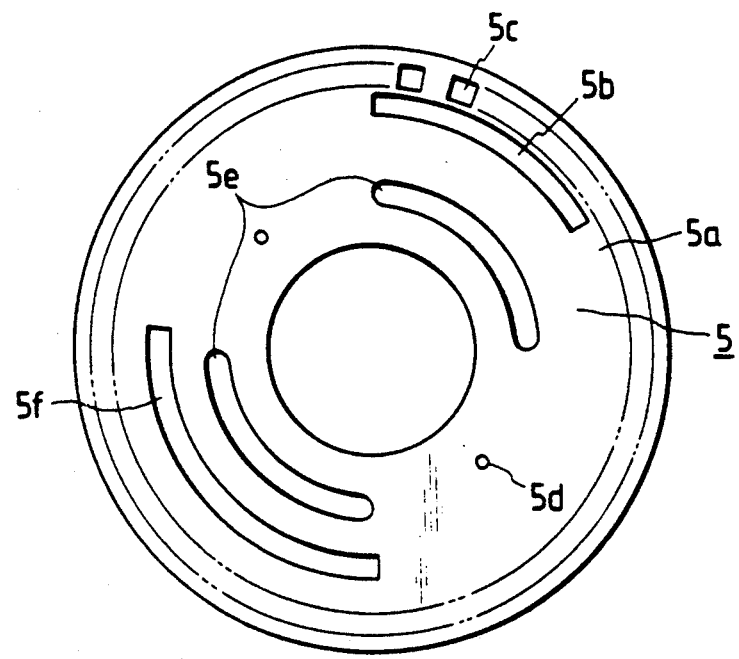
FIGS. 4A and 4B are diagrams showing a needle upper position detecting board for a first and second embodiment, respectively.

FIG. 4A is a diagram showing the needle upper position indicating board 5 of the first embodiment, as viewed from the sewing machine frame side. In FIG. 4A, reference character 5a designates a reflecting surface formed by plating a metal or plastic plate; 5b, position detecting means, namely, a needle upper position detecting through-hole corresponding to the needle upper position; 5c, rotation speed detecting means, namely, rotation speed detecting through-holes; 5d, a pressurization adjusting section, or adjusting holes formed in order to adjust the angle in the direction, of rotation of the needle upper position indicating board 5 from outside the pulley 3; 5e, release holes formed in correspondence to the adjusting holes 4d of the needle lower position indicating board 4 in order to adjust the needle lower position indicating board 4 from outside the pulley 3; and 5f, a release through-hole formed in correspondence to the through-hole 4b of the needle lower position indicating board 4 in order to prevent the reflection of light from the reflecting surface 5a after the adjustment of the angle in the direction of rotation of the needle lower position detecting board 4.

Figure 4B:
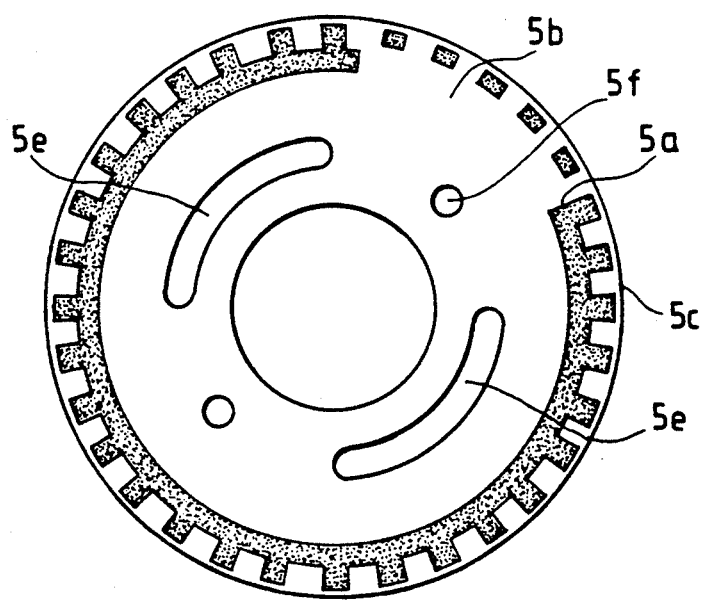

The needle upper position indicating board 5 of the second embodiment is as shown in FIG. 4B when viewed from the sewing machine frame side. The needle upper position indicating board 5 has a position detecting region, namely, a needle upper position reflective indicating means 5b corresponding to the needle upper position, the reflective indicating means being formed on the rear surface of a plastic plate by alumi-chrome plating. It also has a non-reflecting surface 5a painted black by printing for instance; a rotation speed detecting reflecting surface 5c for detecting a speed of rotation; adjusting holes 5f for adjusting the angular position of the needle upper position indicating board 45 through the pulley 3 from outside; and relief holes 5e formed in correspondence to the adjusting holes 4f so that the angular position of the needle lower position detecting board can be adjusted through the pulley from outside.

Figure 5A:
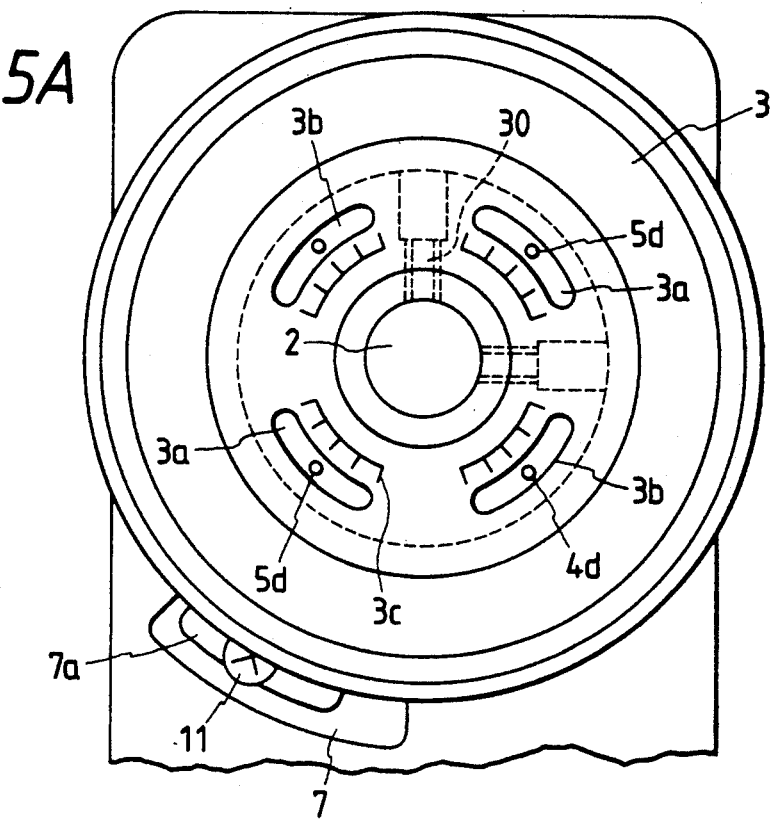
FIGS. 5A–5D are diagrams showing various sides of a pulley.

FIG. 5A is a diagram showing the pulley in the first embodiment, as viewed from outside. In FIG. 5A, reference character 30 designates screws securing the pulley 3 to the spindle 1; 3a, pulley through-holes formed in correspondence to the adjusting holes 5d of the needle upper position indicating board 5; 3b, pulley through-holes formed correspondence to the adjusting holes 4d of the needle lower position indicating board 4; and 3c, angle scales provided along the pulley through-holes 3a and 3b to detect adjustment angles.

Adjustment of the angles in the direction of rotation of the position indicating boards can be easily achieved. With the screws left as they are, the position indicating boards are simply turned with a tool inserted into the adjusting holes 5d and 4d through the pulley throughholes 3a and 3b.

Figure 6:
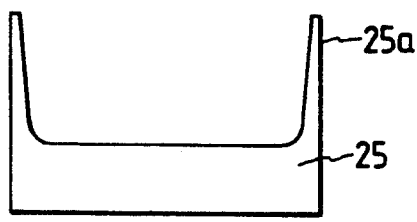
FIG. 6 is a diagram showing a jig used for adjustment of the position detector.

The above-described angle adjustment can be achieved more readily by using a jig 25 as shown in FIG. 6. That is, the angle can be readily adjusted with the two prongs 25a of the jig 25 inserted into the adjusting holes 5d or 4d.

In order to clearly distinguish the needle upper position adjustment and the needle lower position adjustment from each other, the angle scales provided near the pulley through-holes should be changed in color according to the needle upper position and the needle lower position.

When it is not suitable to change the angle scales in color in the above-described manner, marks may be provided according to the needle upper and lower positions.

Figure 5B:
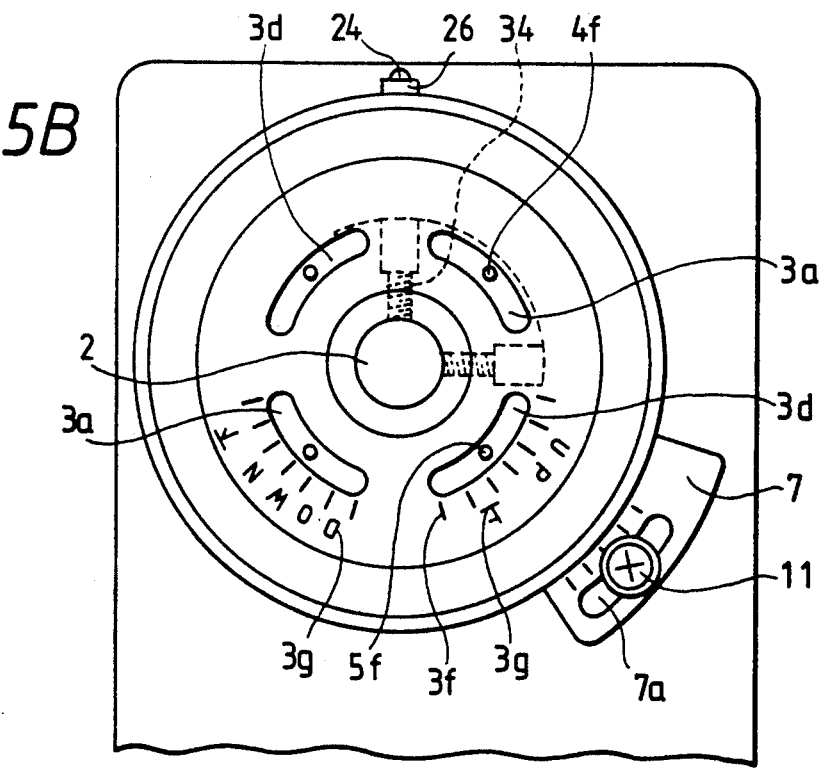
Figure 5C:
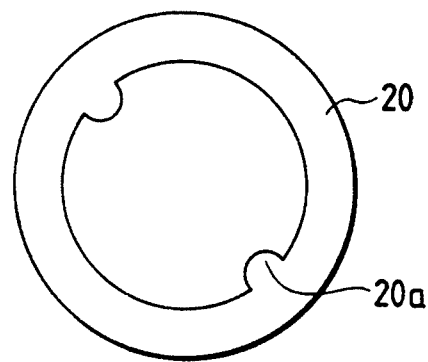
Figure 5D:
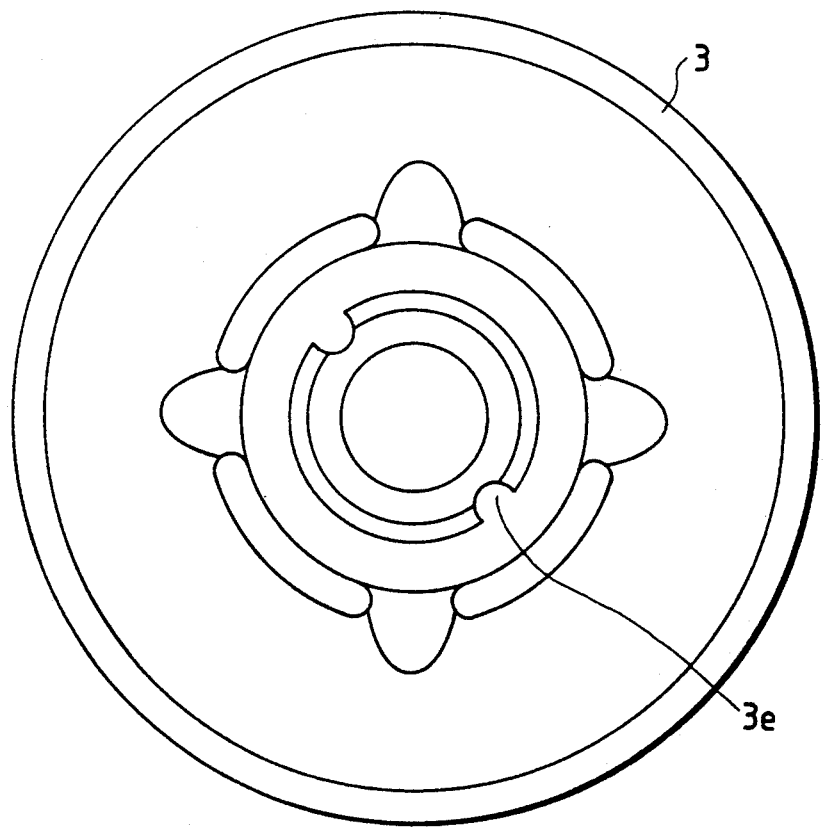

The second embodiment may be described with respect to FIGS. 5B–5D.

The slide board 20 is as shown in FIG. 5C when viewed from the sewing machine frame side. The pulley 3 is as shown in FIG. 5D when viewed from the sewing machine frame side. The slide board 20 has tongues 20a which are engaged with recesses 3e of the pulley so that the former 20 may not turn with respect to the pulley 3.

FIG. 5B shows a pulley 3 as viewed from outside. In FIG. 5B, reference numeral 34 designates screws for fixedly mounting the pulley on the spindle 2; 3a, pulley through-holes confronting the adjusting holes 4f of the needle lower position indicating board 4; 3d, pulley through-holes confronting the adjusting holes 5f of the needle upper position indicating board 5; and 3f, angular scales marked near the pulley through-holes 3a and 3d. Characters 3g (UP and DOWN) are marked near the angular scales 3f for indication of the needle upper position adjustment and the needle lower position adjustment.

The position detector of the second embodiment of the invention is constructed as described above. Hence, the angular positions of the needle upper position detecting board 5 and the needle lower position detecting board 4 can be adjusted without loosening the screws; that is, the angular positions of the indicating boards can be adjusted by turning them with rods or bars inserted into the adjusting holes 5f and 4f through the through-holes 3a and 3d of the pulley 3 from outside. In this operation, since the slide board 20 is provided between the indicating boards 4 and 5 in such a manner that it is not rotatable with respect to the pulley 3, the indicating boards 4 and 5 are free from each other; more specifically, the adjustment in angular position of one of the indicating boards will not turn the other, and vice versa. The angular position can be adjusted more readily with an angular position adjusting jig 25 having protrusions 25a as shown in FIG. 6. That is, the angular positions of the indicating boards 4 and 5 can be readily adjusted by turning them with the protrusions 25a inserted into the adjusting holes 4f and 5f.

In the above-described embodiment, the characters (UP and DOWN) are marked along the angular scales for indication of the needle upper position adjustment and the needle lower position adjustment; however, the angular scales may be printed in different colors for the same purpose.

A third embodiment of the invention will be described with reference to FIG. 7.

Figure 7:
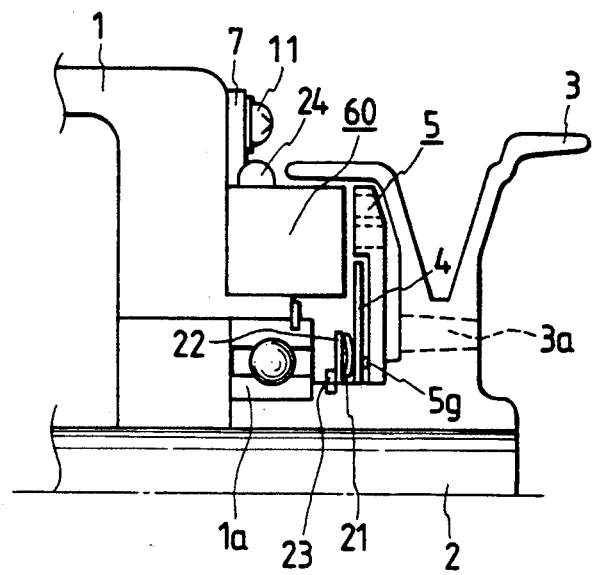
FIG. 7 is a side view, with parts cut away, showing a third embodiment of the invention.
Figure 8:
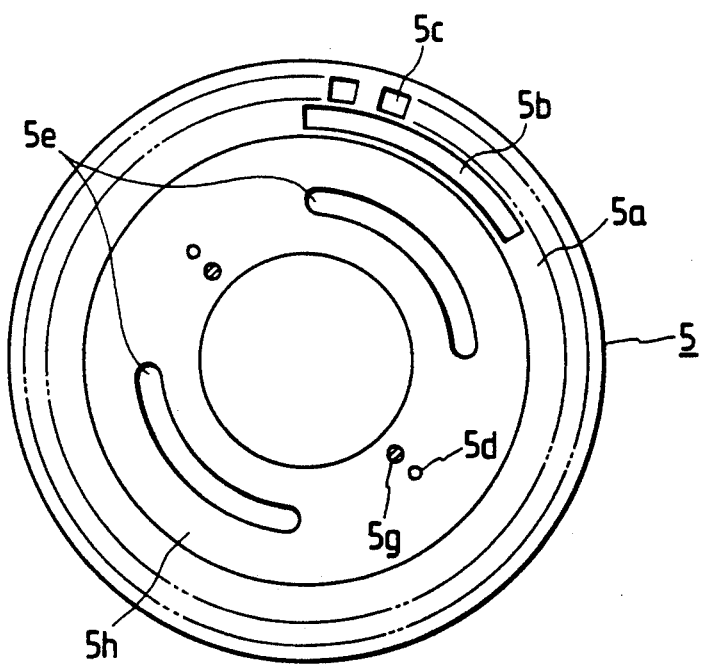
FIG. 8 is a diagram showing a needle upper position detecting board in the third embodiment of the invention.

As shown in FIG. 7, a needle upper position indicating board 5 is made of resin material such as plastics, and it is recessed so that the reflecting surface of the needle upper position indicating board 5 is flush with that of the needle lower position indicating board 4. The board 5 has slide protrusions 5g on its inner peripheral portion; that is, the second embodiment eliminates the slide board of the first embodiment. FIG. 8 is a diagram showing the needle upper position detecting board 5 as viewed from the sewing machine frame. In FIG. 8, reference character 5a designates the aforementioned reflecting surface formed by plating a resin plate; 5b, a needle upper position detecting through-hole corresponding to the needle upper position; 5c, rotation speed detecting means, namely, rotation speed detecting through-holes; 5d, adjusting holes for adjusting the angle in the direction of rotation of the needle upper position indicating board 5 from outside the pulley 3; 5e, release holes formed in correspondence to the adjusting holes 4d of the needle lower position indicating board 4 so that the latter 4 can be adjusting in position from outside the pulley 3; and 5h, the bottom of the recess formed in the board 5, the bottom 5h being black for absorption of light. Accordingly, it is unnecessary for the board 5 to have the release through-hole 5f which is formed in the board 5 of the first embodiment. The other arrangement is the same as that of the first embodiment. As was described above, in the second embodiment, the reflecting surface of the needle upper position indicating board is flush with that of the needle lower position indicating board. Therefore, the detectors are equal in the distance from the light emitting point to the light receiving point, and accordingly it is unnecessary to adjust the positions of the detectors in the second embodiment.

Figure 9:
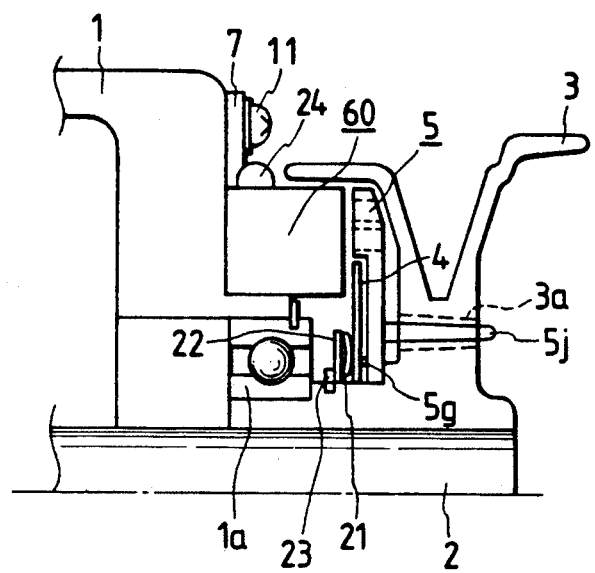
FIG. 9 is a side view, with parts cut away, showing one modification of the invention.
Figure 10:
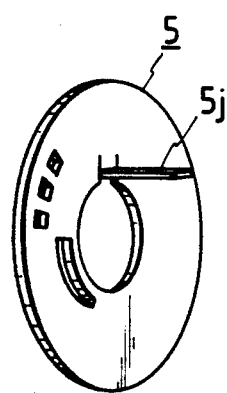
FIG. 10 is a perspective view showing a needle upper position detecting board in another embodiment of the invention.

FIGS. 9 and 10 show modifications in the first, second and third embodiments of the invention.

In FIG. 9, reference character 5j designates adjusting means, namely, adjusting protrusions formed on the needle upper position indicating board 5 in such a manner that they are extended through the pulley through-holes 3a of the pulley 3. The angle of rotation can be readily adjusted by operating the adjusting protrusions 5j. Similarly, adjusting protrusions may be formed on the needle lower position indicating board 4, to adjust the angle of rotation of the latter.

Figure 11:
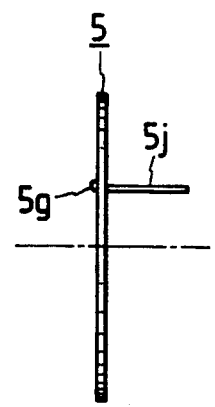
FIG. 11 is a sectional view showing a needle upper position detecting board in another embodiment of the invention.
Figure 12:
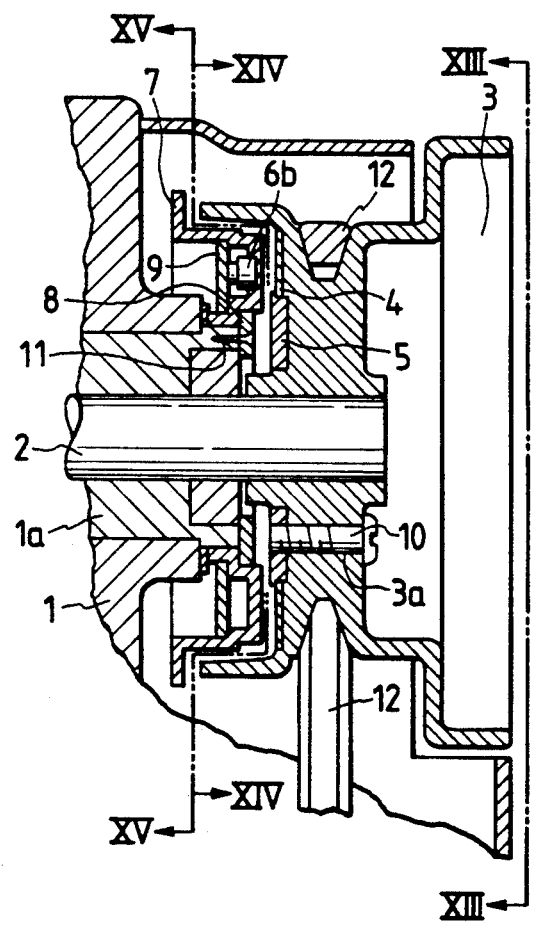
FIG. 12 is a sectional view showing essential components of a conventional position detector.
Figure 13:
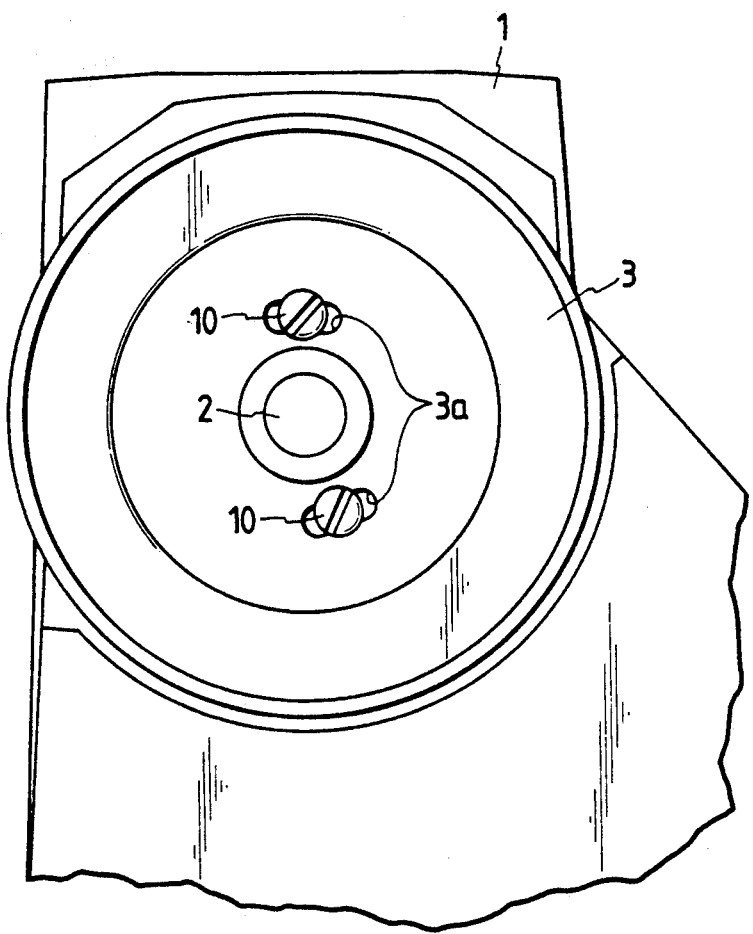
FIG. 13 is a front view of a pulley in FIG. 12.
Figure 14:
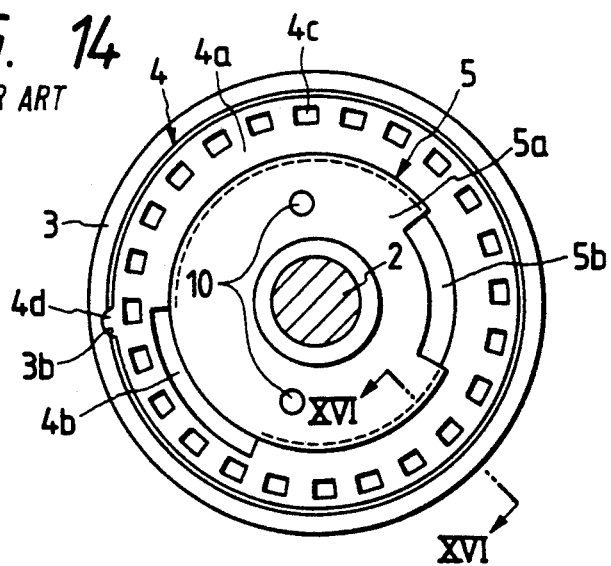
FIG. 14 is a front view of a needle upper position detecting board and a needle lower position detecting board shown in FIG. 12.
Figure 15:
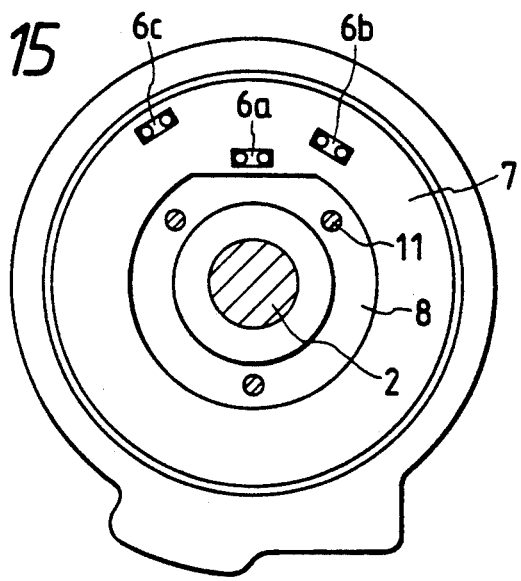
FIG. 15 is a front view of a detector cover in FIG. 12.
Figure 16:
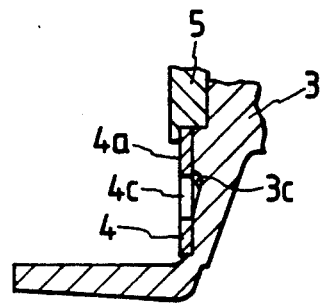
FIG. 16 is a sectional view of a groove formed in the pulley in FIG. 12.

FIG. 10 shows how to form a protrusion on the needle upper position detecting board 5 which is in the form of a disc. That is, FIG. 10 shows a slide protrusion 5g and an adjusting protrusion 5j which are formed simultaneously by cutting and bending a portion of a metal plate. FIG. 11 is a sectional view of the position detecting board 5 with the slide protrusion 5g and the adjusting protrusion 5j.

In the above-described embodiments, two position detecting annular members are employed; however, the technical concept of the invention is applicable to the case where one position detecting annular member or more than two position detecting annular members are employed.

In the above-described embodiments, the annular members are pushed through the slide board 20, the pre-load spring 21, the end board 22, the C-ring 23 and the slide protrusion 5g; however, it goes without saying that they may be pushed through other means.

In the above-described embodiments, the method of transmitting and receiving a light signal is employed for position detection; however, the invention is not limited thereto or thereby.

While the invention has been described with reference to the sewing machine needle position detecting device, the technical concept of the invention can be equally applied to a position detecting device in which a position detecting member is provided between a support and a rotor.

The position detecting device thus constructed according to the various embodiments of the invention has one or more of the following notable effects:

The rotor and the position detecting annular member are abutted against each other, and therefore the use of screws can be eliminated, and the annular member can be readily adjusted in angular position with the tool which is inserted through the holes of the rotor and engaged with the adjusting means of the annular member.

The annular members are different in radius so that the position detecting means are not overlapped by each other, and the through-holes are formed in the rotor, so that the adjusting means of the annular members can be reached through the through-holes thus formed. Therefore, even if the device has a plurality of annular members, the positions of the annular members can be detected and adjusted individually.

A plurality of position detecting means are arranged at the equal distance from the detectors. Therefore, adjustment of the detectors and processing of the detection signals can be readily achieved. A slide board is provided between the two annular elements 4 and 5, rotation of one of the annular elements will not turn the other, and vice versa.

The relief holes are formed in the annular element on the rotor side so that the annular element on the support side can be turned with the rods or bars inserted through the relief holes. Hence, the plurality of annular elements can be individually adjusted in angular position.

The position detecting region is defined on each annular element by coloring the latter black. This eliminates the groove which is required in the case whether the position detecting region is made up of the through-hole as in the conventional position detector.

What is claimed is:

1. A position detecting device comprising:
   a shaft;
   a support rotatably supporting said shaft;
   a rotor having at least one through-hole having a predetermined configuration which is cut parallel to the axis of said shaft, said rotor being fixedly mounted on said shaft so that said rotor is turned together with said shaft;
   an annular means mounted on said shaft in such a manner that said annular means is disposed between said support and said rotor, said annular means having pushing means provided on part of said annular means to push said annular means toward said rotor so that said annular means is rotated together with said rotor, position indicating means provided on part of said annular means to indicate a predetermined position of said annular means, and adjusting means for enabling the application of force through said at least one through-hole of said rotor to said annular means so as to turn said annular means with respect to said rotor; and
   detector means secured to said support, for detecting said position indicating means of said annular means which is rotating.

2. A position detecting device as claimed in claim 1, in which said support is a sewing machine frame.

3. A position detecting device as claimed in claim 1, in which said annular means comprises at least two annular members, said annular members provided closer to said rotor being larger than said annular member closer to said support, and said annular member comprising position indicating means provided on the part of said annular member closer to said rotor which is not overlapped by said annular member closer to said support; and a hole having a predetermined configuration which is formed in said annular member closer to said rotor in correspondence to said adjusting means of said annular member closer to said support.

4. A position detecting device as claimed in claim 3, in which said annular member closer to said rotor has a recess coaxial with said shaft and said annular member closer to said support is arranged in said recess in such a manner that said annular member closer to said rotor is flush with said annular member closer to said support.

5. A position detecting device comprising:
   an annular means which is engaged with a rotor, said rotor being fixedly mounted on a shaft and having at least one through-hole having a predetermined configuration which is cut along the axis of said shaft and said annular means having position indicating means for generating a signal periodically in synchronization with the rotation of said shaft;
   detector means operative with respect to said annular means and having a predetermined space on a stationary side which is opposite to the side where said rotor is provided, to detect said position indicating means of said annular means;
   pushing means for pushing said annular means against said rotor; and
   adjusting means for enabling the application of force through said at least one through-hole of said rotor to said annular means pushed against said rotor, to adjust the position of said annular means relative to said rotor.

6. A position detecting device as claimed in claim 5, in which said annular means comprises a plurality of annular members which are large in diameter towards said rotor from said detector means are arranged along the axis of said shaft, and a though-hole is formed in said annular member closer to said rotor to operate said adjusting means adapted to turn said annular member closer to said detector unit.

7. A position detecting device as claimed in claim 6, in which said annular members are a needle upper position detecting board and a needle lower position detecting board which are provided on a shaft which moves the needle of a sewing machine up and down.

8. A position detecting device as claimed in claim 6, the position indicating means of said annular member closer to said rotor is protruded towards said detector unit so that said position indicating means of said plurality of annular members are flush with one another with respect to the axis of said shaft.

9. A position indicating device as claimed in claim 7, the position indicating means of said annular member closer to said rotor is protruded towards said detector unit so that said position detecting means of said plurality of annular members are flush with one another with respect to the axis of said shaft.

10. A position detecting device as claimed in claim 5, in which said pushing means is a pre-load spring.

11. A position detecting device as claimed in claim 7 further comprising: detector means position adjusting means for rotatably mounting said detector means on a sewing machine frame, to adjust the position of said detector means in the direction of rotation of said shaft.

12. A position detecting device as claimed in claim 6, in which spacers are provided between the pressurizing parts of said plurality of annular members to allow said annular members to turn readily.

13. A position detecting device as claimed in claim 5, in which, in order to operate said adjusting means, a jib is provided which can be inserted into a hole formed in said annular member and can be removed therefrom.

14. A position detecting device as claimed in claim 6, in which position scales are provided on said rotor, indicating the positions of said plurality of annular members with respect to the position of said rotor, respectively.

15. A position detecting device as claimed in claim 7, in which said rotor is a pulley, and said annular members are held on said pulley.

16. A position detecting device as claimed in claim 10, in which said detector means has display means for indicating operating conditions.

17. A position detecting device as claimed in claim 5, in which said adjustment means is a protrusion formed on said annular member in such a manner that said protrusion is extended through said through-hole having the predetermined configuration which is cut in said rotor along the axis of said shaft.

18. A position detecting device as claimed in claim 6 in which a protrusion is formed at the pressurizing part of one annular member in such a manner as to abut against another annular member, thus allowing said plurality of annular members to turn readily.

19. A position detector comprising:
a shaft;
a support for rotatably supporting said shaft;
a rotor fixedly mounted on said shaft, said rotor having at least one through-hole with a predetermined configuration;
a plurality of annular elements which are arranged between said support and said rotor, said annular elements are coaxial with said rotary shaft, an annular element on the rotor side being larger in diameter than an annular element on the support side;
a slide board interposed between said annular elements so as to be nonturnable with respect to said rotor;
pressing means for abutting said annular elements against said rotor so that said annular elements are rotatable together with said rotor, wherein said annular element on the rotor side has a position indicating portion which is not overlapped by said annular element on the support side, and said annular elements being turnable with respect to said rotor with a force applied through said at least one through-hole formed in said rotor; and a position detector unit fixedly mounted on said support for detection of angular positions of said annular elements.

20. A position detector as claimed in claim 19, in which said annular elements are made of a reflecting material, and have position indicating regions which are defined by coloring.

21. A position detector as claimed in claim 19, in which said slide board has an engagement portion for engaging with said rotor.

22. A position detector comprising:
a rotary shaft;
a rotor fixedly provided on said rotary shaft, said rotor having a through-hole with a predetermined configuration in an axial direction of said shaft;
a plurality of annular elements engaged with said rotor and arranged in an axial direction of said rotary shaft, said annular elements being larger in diameter toward a side of said rotor and provided with a position indicating portion for periodically indicating a signal in synchronism with rotation of said rotary shaft;
detecting means for detecting said position indicating portion of said annular elements, said detecting means being faced with said annular elements with a predetermined gap on a stationary side opposite to the side of said rotor with respect to said annular elements;
pressure means for pushing said annular elements toward said rotor to hold said annular elements in contact with said rotor;
adjusting means for adjusting a position of said annular elements relative to said rotor by rotating said annular elements by application of an external force through said through-hole of said rotor due to an external force;
an annular hole provided on an annular element which is located on the side of said rotor, said adjusting means passing through said annular hole; and
a slide board nonturnably engaged with said rotor and interposed between said annular elements.

23. A position detector as claimed in claim 22 in which said slide board is fixed to said rotor.

24. A position detector as claimed in claim 22, in which said slide board is in the form of a ring, an outer diameter of which is substantially equal to or less than an outer diameter of said pressure means.

25. A position detector as claimed in claim 22, in which said position indicating portions of said annular elements are exposed on a side of said annular element, and said annular element is provided with a light reflecting portion and a light absorbing portion as an indicating portion.

26. A position detector as claimed in claim 25, in which said light reflecting portion of said position indicating portion is made of a reflecting material, and said light absorbing portion thereof is made of a coloring material.

27. A position detector as claimed in claim 26, in which said annular elements are made of a transparent material, and said light reflecting portion is provided on a side opposite to said position indicating portion of said annular element.

* * * * *